Figure 1:
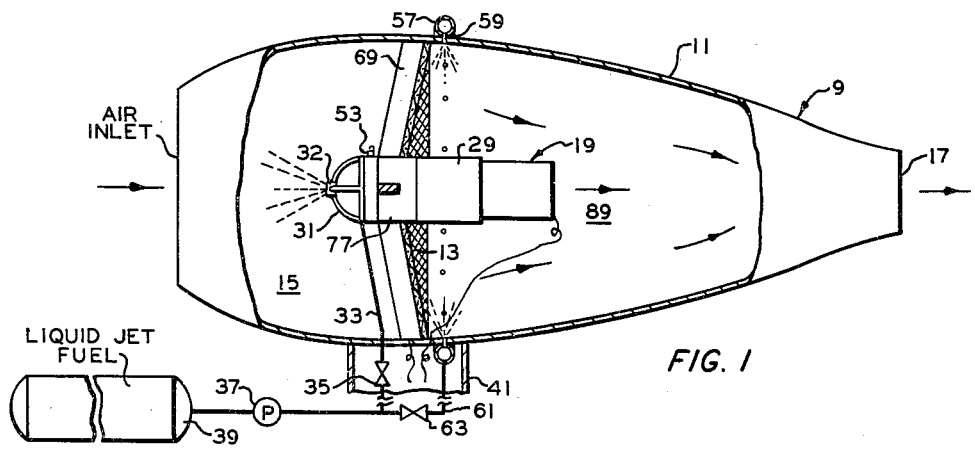

Nov. 28, 1961   R. O. GOSE   3,010,678
RAMJET MOTOR POWERED HELICOPTER
Filed July 31, 1959

INVENTOR.
R. O. GOSE
BY *Hudson & Young*
ATTORNEYS

3,010,678
RAMJET MOTOR POWERED HELICOPTER
Robert O. Gose, Los Angeles, Calif., assignor to Phillips Petroleum Company, a corporation of Delaware
Filed July 31, 1959, Ser. No. 830,952
2 Claims. (Cl. 244—17.11)

This invention relates to a ramjet propulsion device for supplying rotational power to the rotor of a helicopter. In one aspect, it relates to means for accelerating the rotor of a ramjet powered helicopter to such a speed that sufficient air is supplied by ram action to operate the ramjet motor. In another aspect, it relates to use of a solid propellant rocket mounted within a ramjet housing as the means for accelerating the ramjet engine to ramjet operational speed. In still another aspect, it relates to use of a solid propellant rocket in such application in which the solid propellant rocket is completely consumed so that there is no metal part to be ejected from the ramjet engine housing while the helicopter rotor is rotating at high speed.

In ramjet engines, air is introduced through a restriction or ram opening in the front end of a motor housing at a high velocity and is compressed aerodynamically. In this condition, the compressed air is mixed with fuel and the fuel is ignited and burned. The products of combustion are discharged from the rear end of the housing at a high velocity to provide the engine with forward propulsive thrust. The engine obtains oxygen required for combustion of fuel from the air introduced into the engine by ram action so that air is not available for combustion until the engine has obtained a relatively high speed. In some cases, an auxiliary source of air is for starting the engine. When an auxiliary source of air is used, the exhaustion of the combustion products may induce sufficient air to maintain combustion at a low rate without developing sufficient thrust to move the craft upon which the engine is mounted. However, ordinarily appreciable thrust is not developed until the ram engine has attained the relatively high speed. When a sufficiently high rate of speed is attained, air is supplied for combustion through ram action to provide operational thrust.

One application of ramjet engines is as means for providing rotational power to helicopter rotors. As is known, helicopter rotors must be operated at a relatively high speed before sufficient lifting power is available to lift the craft. Furthermore, in this present case in which ramjet engines are used as a source of power for the helicopter rotors, the rotors and the ramjet engines must be rotated at a sufficiently high speed to obtain sufficient air by ram action for operation of the ramjet engine before the craft can be lifted from the ground.

This present invention provides means for acquiring rapid acceleration of helicopter rotors up to ramjet engine operating speed in helicopters employing ramjet engines on the rotor blades as source of power.

An object of this invention is to provide means for accelerating ramjet engines on helicopter rotor blades to such a speed that the ramjet engines can take over as sources of power. Another object of this invention is to provide solid propellant rockets for accelerating the ramjet engines to their operating speed. Another object of this invention is to provide solid propellant rockets for such use in which no solid material remains to be ejected from the ramjet motor housing after the rocket is burned out and the ramjet engine is placed in operation. Still another object of this invention is to provide such a solid propellant rocket in which all enclosing parts or support elements are consumed after the solid propellant has been consumed. Still other objects and advantages of this invention will be realized upon reading the following description which taken with the attached drawing forms a part of this specification.

Figure 2:
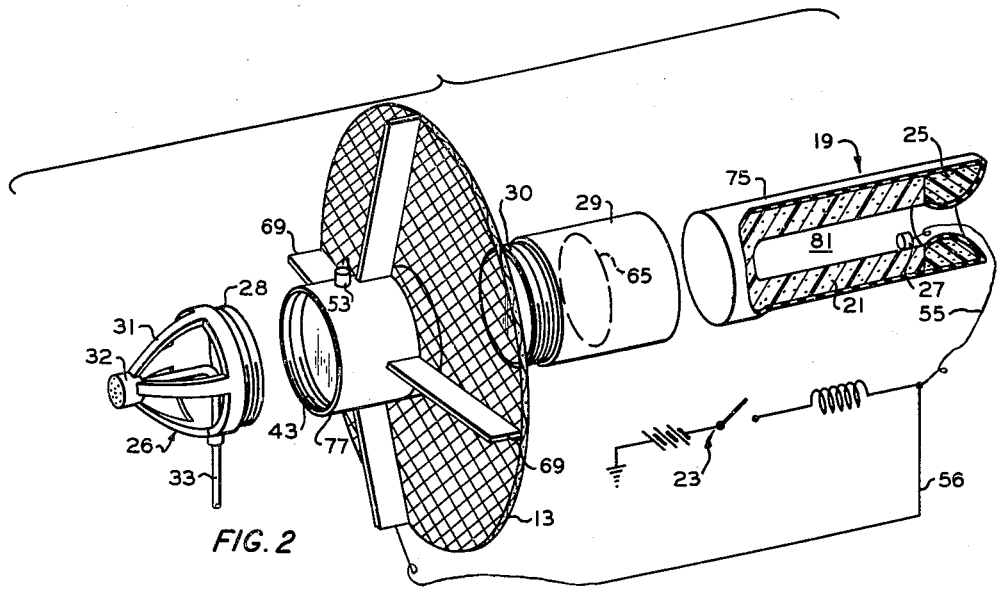
Figure 3:
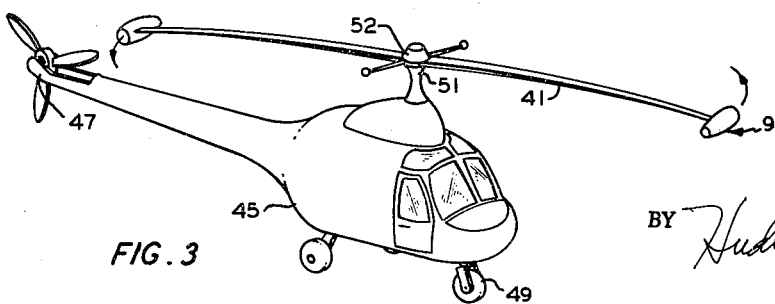

FIGURE 1 illustrates, in diagrammatic form and partly in section, the apparatus of this invention. FIGURE 2 illustrates diagrammatically a form of solid rocket and a support therefor suitable for use in this invention. FIGURE 3 illustrates diagrammatically a helicopter having ramjet engines mounted on the rotor blades.

In the drawing, reference numeral 9 identifies the ramjet engine attached to the end of a helicopter rotor blade 41. Reference numeral 11 identifies the housing of the ramjet engine, this housing being of more or less conventional design. Disposed within the housing is a perforate flame holder 13 positioned within the housing nearer the inlet end 15 than the outlet end 17 of the housing. This flame holder can be of any suitable material, such as a metal screen or hardware cloth. The flame holder should be capable of withstanding temperatures and stresses encountered in such a motor. The screen or hardware cloth can be from, for example, 4 to 8 mesh, i.e., openings per linear inch. Within the center of the flame holder is a hollow metallic cylinder 77, interiorly threaded at both ends. The cylinder 77 is supported by bars 69 which extend radially from the cylinder to the housing 11 to which they are suitably attached, as by welding. A cylinder 29 of combustible material is threaded at 30 for insertion into the adjacent threaded end of cylinder 77. A plate 65 is firmly attached to the inner wall of cylinder 29, the plate also being of a combustible material.

A support member 26 is provided with threads 28 for meshing with threads 43 in cylinder 77. In the absence of cylinder 29 and a rocket motor 19, subsequently described, support bars 31 with open spaces therebetween serve as a flame holder for the opening through cylinder 77, if necessary. In some cases the diameter of cylinder 77 is sufficiently small that a flame holder across its open section is not required.

A tube 33 provided with a valve 35 provides fuel to the pilot spray nozzle 32. Liquid fuel for operation of the ramjet motor is supplied from fuel tank 39 through a tube 61 provided with a valve 63. A pump 37 is provided for supplying fuel under suitable pressure to pilot nozzle 32 and through a fuel tube 57 to fuel spray nozzle 59 disposed around the circumference of the housing 11 as shown. Spray nozzles 59 direct the fuel into the combustion chamber 89 of the engine.

In FIGURE 2 is also illustrated in some detail the construction of a suitable solid propellant rocket suitable for use according to this invention. A body of solid propellant 21 is, in general, cylindrical in form. The solid propellant form 21 is made in the general form illustrated. Opening 81 can be circular in section or star-shaped or any other suitable shape to provide sufficient burning surface. Additional solid propellant 25 in the form of a nozzle is used if desired.

The solid propellant rocket illustrated in FIGURE 2 is intended to be a caseless rocket, that is, one which is not housed in a rigid metal case. The outer surfaces of the solid propellant grain 21 and 25 are, however, restricted in a conventional manner against burning. It is sometimes desirable, however, to provide some mechanical protection to the outer surface of the propellant grain. While such a propellant grain is a solid, it is not a hard solid and it is subject to mechanical damage such as scratches. A thin layer of adhesive such as an epoxy resin is sprayed, brushed or otherwise applied to the outer surface of grains 21 and 25 and to the outer surface of this adhesive is fixed a protective cover of such a combustible material as a polyethylene resin. An igniter 27 is provided for starting burning of the propellant. While propellant grain 25 is illustrated as having a central opening of the general shape of a nozzle, a nozzle at this position of rocket 19 is not essential. The solid propellant rocket 19 with its coating of restrictive material, with or without a mechanically protective cover, as combustible cover 75, is inserted in to cylinder 29 against plate 65. In this position the rocket, which may also be termed a booster rocket, is operable according to this invention.

In FIGURE 3 is illustrated the general manner in which the ramjet engines are installed on the ends of rotor blades 41 of a helicopter.

In some instances, a ramjet engine is attached to the end of each of four rotor blades of the helicopter while in other cases, it may be desirable to employ only a pair of ramjet engines on two of the four blades. In this latter case, the engines are attached to opposite rotor blades. In other cases the helicopter may have only two rotor blades in which case a ramjet engine is attached to the end of each blade. In FIGURE 3, reference numeral 51 identifies the rotor shaft housing above which is a rotor head 52 to which the blades 41 are attached, while reference numeral 45 identifies the body of the helicopter having wheels 49 and a tail end section 47. As illustrated, the blades are firmly attached to the head 52 and the entire assembly of blades and head rotates under the influence of the ramjet motors 9.

One advantage of using sources of power attached to the ends of the rotor blades is that an engine need not be provided in the body of the helicopter. All that is necessary to be provided in the body of the helicopter in this case is a fuel tank or fuel tanks along with a pump for pumping fuel from the tank to the engines and control device or devices as required.

A spark plug 53 or other suitable ignition device is provided as illustrated for igniting the liquid fuel sprayed from pilot nozzle 32 when the helicopter is to be placed in operation. Igniter 27 can, if desired, be energized by the same source of energy employed for energizing spark plug 53. Wires 55 and 56 are provided for supplying electrical energy from source 23 to igniter 27 and to spark plug 53, respectively. The sequence of ignition timing, for igniting fuel from spray nozzle 32 and for igniting the solid propellant 21 can be manual, timed, or controlled by an accelerometer device which will start ramjet fuel flow and initiate spark in spark plug 53 when the rotor has reached the proper speed.

The case or protective plastic cover 75, as mentioned, can be of such a plastic as a firm and relatively rigid polyethylene. When this protective cover is such a polyethylene, this material will be burned after the solid propellant has been burned from the rocket because in general oxygen will not be present for burning of the polyethylene. However, in case it is desired that the polyethylene be burned without need for an atmospheric source of oxygen an oxidant such as ammonium nitrate is incorporated in the polyethylene resin during its production in such a manner that upon reaching the desired temperature the oxidant provides oxygen for the complete combustion of the polyethylene. In any event, any polyethylene or other combustible material remaining after the rocket propellant has been consumed and after the ramjet engine has acquired a sufficient speed for its normal operation, the remaining combustible material will be burned by combustion with atmospheric oxygen entering through the inlet 15.

The hereinbefore mentioned epoxy resin compositions are suitable for bonding the propellant grain to the mechanically protective cover. Epoxy adhesives having an epoxide equivalent weight of about 140 to 525 are generally preferred. A diluent, such as benzene, methylene chloride or carbon tetrachloride, is used to thin the epoxy compound and facilitate application by brushing, or by spraying. Various curing agents such as diethylene aminopropylamine, diethylene triamine, and dicyanamide are used to promote cure of the epoxy compound. Still other epoxy-containing compounds which are employed as adhesives include liquid polymers of 1,3-butadiene which are epoxidized, for example, by treatment with a peroxide. The polymers obtained by copolymerization of 1,3-butadiene with monomers such as styrene are epoxidized to give products used in the production of adhesives for restricting the surface of the solid propellant and for attaching the protective cover to the exterior surface of the solid propellant. In some cases a mechanically protective cover need not be used and in such a case it is merely necessary to restrict the exterior surface of the propellant grain against burning. In this latter case the rocket motor is strictly a caseless motor.

In accordance with the present invention, a conventional type of solid propellant is used in the rocket motor. The solid propellant should have at least a moderately high reaction temperature since the rocket exhaust gases may serve as an additional means for ignition of the ramjet fuel. The solid propellant furthermore should have a sufficiently long burning time that during its burning the rotor blades of the helicopter will acquire sufficient rotational speed that air entering the ramjet inlets will be sufficient for the development of thrust upon introduction of fuel and burning of the fuel with the ram air. In general, ramjet speeds at the rotor blade ends of from about 350 to 700 miles per hour are required for providing sufficient ram air for normal operation of the ramjet engines.

A suitable solid propellant for this invention comprises ammonium nitrate as an oxidant and a polymeric organic compound, such as a copolymer of butadiene and a vinylpyridine or a copolymer of butadiene and styrene. The copolymer functions as the binder as well as the fuel in the propellant. Suitable propellants and methods for preparing them are disclosed in copending application, Serial No. 284,447, filed April 25, 1952.

A preferred solid propellant is prepared using as a binder a low Mooney rubbery copolymer of 1,3-butadiene and 2-methyl-5-vinylpyridine, ammonium nitrate as the oxidizer and a burning rate catalyst of the complex cyanide type, such as milori blue, Prussian blue, Turnbull's blue and the like. Such a propellant composition and its preparation is fully described in a copending application of Mahan and Hutchinson, Serial No. 561,944, filed January 27, 1956, now abandoned.

The copolymer of 1,3-butadiene and 2-methyl-5-vinylpyridine is prepared by the aqueous emulsion polymerization at 41° F. of a recipe comprising 90 parts 1,3-butadiene and 10 parts 2-methyl-5-vinylpyridine and utilizing an alkali metal sulfoxylate formaldehyde as part of the activator system. The other ingredients in the polymerization recipe include 200 parts water, 6.0 parts potassium fatty acid soap, 0.1 part potassium hydroxide, 0.1 part potassium chloride, 0.3 part Daxad 11, 0.02 part $FeSO_4 \cdot 7H_2O$, 0.4 part Sequestrene AA, 0.10 part sodium formaldehyde sulfoxylate·$2H_2O$, 0.10 part cumene hydroperoxide and 0.50 part tertiary dodecyl mercaptan, all of said amounts of material being parts by weight per 100 parts of total monomers. This copolymer and its preparation is fully described in the copending application of Hanmer and Carroll, Serial No. 470,371, filed November 22, 1954. Such a copolymer is utilized in a binder composition comprising 100 parts of the copolymer, 20 parts benzophenone, 1 part N,N-dimethyl-S-tertiary butyl sulfenyl dithiocarbamate, 0.75 part sulfur, 3 parts zinc oxide, 1 part Aerosol OT, and 3 parts Flexamine, all of said parts being parts by weight. The propellant composition itself, which is the preferred propellant for use in the ramjet engine as herein disclosed, is prepared by mixing the ingredients on a roll mill and curing for 24 hours at 175° F. and a suitable propellant composition consists of 82.5 parts ammonium nitrate, 17.5 parts of the binder composition set forth above and 1 part of milori blue. Other solid monopropellants and composite propellants can also be used. Another suitable propellant, for example, comprises ammonium perchlorate and a polysulfide rubber.

The ramjet fuel used in accordance with this invention is ordinarily in liquid form, although gaseous fuels can be used. Usually, the ramjet fuel is of the hydrocarbon type containing paraffinic, naphthenic, olefinic and/or aromatic hydrocarbons. The ramjet fuel can be a pure hydrocarbon or a mixture of hydrocarbons. Specific examples of hydrocarbons which can be used in accordance with this invention comprise propane, butane, pentane, heptane, ethylene, propylene, butylene, acetylene, butadiene, benzene, toluene, mixtures of two or more of these. A preferred ramjet fuel is a conventional jet engine fuel designated as a JP-3 or JP-4 fuel. Other known fuels for ramjet engines can also be used, such as, for example, ammonia or mixtures of ammonia and hydrazine or mixtures of ammonia and acetylene.

In case the rocket of this invention is a cased rocket made of a combustible material, the case may be made of substantial thickness, that is, sufficiently thick to act as a support for the projecting solid propellant when one end of the grain is mounted in such a holder as holder 29 illustrated in FIGURE 2.

The placing of the ramjet engine near the rotor tip reduces complexity in construction of the rotor blade and reduces the cantilever stresses on the rotor during acceleration to proper rotational speed.

In the operation of the device as herein disclosed with the helicopter rotor blades at rest, igniter 27 is energized with the result that solid propellant material 21 begins to burn. Gases exhausted from this propellant issue through nozzle 23 and through the exhaust outlet 17 of the engine housing and thrust is developed to start rotation of the rotor. As the solid propellant burns considerable heat is evolved and this entire assembly becomes heated. Since it is intended that sufficient thrust be obtained from the solid rockets that the rotor reaches such a rotational speed that the ramjet engines acquire a velocity of from about 350 to 700 miles per hour at which speed sufficient air is rammed into the engine housing to support combustion of liquid fuel. If desired, fuel is injected through nozzle 32 and nozzles 59 at the moment of energizing of the igniter 27. In this case, by the time, that is, by the passage of a very few seconds required to obtain the above-mentioned speed, the conditions are proper for ignition of the jet fuels introduced through sprays 59 and through spray 32. If desired, spark plug 53 may be energized at the same time igniter 27 is energized so that fuel sprayed through nozzle 32 ignites with the result that flame passes through the perforations in the flame holder to ignite the fuel sprayed through sprays 59. As speed of the ramjet engine reaches the normal operating speed, the velocity of the burning gases swept through the perforations in flame holder 13 exceed the rate of flame propagation and burning is not obtained then on the air inlet side of the flame holder 13. In this manner, flame and combustion are obtained only on the downstream side of the flame holder 13 as regards the direction of air flow.

After the solid propellant 21 and 25 has been consumed, the case or plastic cover 75 is consumed along with the combustible holder 29 for the solid propellant rocket and after those materials are consumed, nothing is present on the downstream side of flame holder 13 excepting flame from the burning jet fuel. In this manner, there is not a solid element to be ejected from the jet engine.

The use of a solid propellant for accelerating the ramjet engine to operating speed is not the equivalent of liquid fuel for this purpose because of the hazards involved in the use of liquid fuel in such an application.

The non-equivalence of a solid fuel rocket or accelerating a ramjet engine of this invention is further implemented by the requirement of liquid rocket propellant requiring the presence of a fuel tank, an oxidizer tank, pipes or tubes leaving from these tanks to the rocket combustion chamber along with flow control devices. This present invention which employs only solid fuel rockets for acceleration of the ramjet engines is believed to be a marked advance in the art of helicopter operation where rapid takeoff is desired. In this case, only a few seconds is required for the rotor to acquire sufficient speed that the ramjet engines take over the power duties of the craft and after the ramjet engines develop sufficient thrust only an additional few seconds are required for the lifting power of the rotating mechanism to be sufficient to render the craft airborne.

While certain embodiments of the invention have been described for illustrative purposes, the invention obviously is not limited thereto.

I claim:

1. A combined ramjet and rocket propulsion device, comprising in combination a generally cylindrcal permanent metal ramjet housing tapering to a reduced diameter air inlet and a reduced diameter jet outlet, a permanent perforate metal flame holder disposed across the diameter of said housing and secured thereto intermediate said inlet and outlet, means to supply fluid ramjet engine fuel to a point in said housing adjacent said flame holder, and a completely combustible solid propellant rocket engine secured in said housing downstream of said flame holder and positioned to fire a rocket blast of flame out said exhaust whereby sufficient air is entrained to cause enough air to enter said air inlet to support continuous ramjet action of said device after said rocket has burned out, the combustion of said rocket increasing the space available in said ramjet housing.

2. A helicopter, comprising in combination a body, a plurality of radially disposed rotor blades pivotally mounted on said body, a separate ramjet engine mounted on each rotor blade, said engines each comprising in combination a generally cylindrical permanent metal ramjet housing tapering to a reduced diameter air inlet and a reduced diameter jet outlet, a permanent perforate metal flame holder disposed across the diameter of said housing and secured thereto intermediate said inlet and outlet, means to supply fluid ramjet engine fuel to a point in said housing adjacent said flame holder, and a completely combustible solid propellant rocket engine secured in said housing downstream of said flame holder and positioned to fire a rocket blast of flame out said exhaust whereby sufficient air is entrained to cause enough air to enter said air inlet to support continuous ramjet action of said device after said rocket has burned out, the combustion of said rocket increasing the space available in said ramjet housing.

References Cited in the file of this patent

UNITED STATES PATENTS

| | | |
|---|---|---|
| 2,043,268 | Skinner | June 9, 1936 |
| 2,419,866 | Wilson | Apr. 29, 1947 |
| 2,605,608 | Barclay | Aug. 5, 1952 |
| 2,912,820 | Whitmore | Nov. 17, 1959 |

FOREIGN PATENTS

| | | |
|---|---|---|
| 754,141 | Great Britain | Aug. 1, 1956 |